D. F. FESLER.
LUBRICATING SYSTEM.
APPLICATION FILED MAR. 17, 1920.
1,408,573.
Patented Mar. 7, 1922.
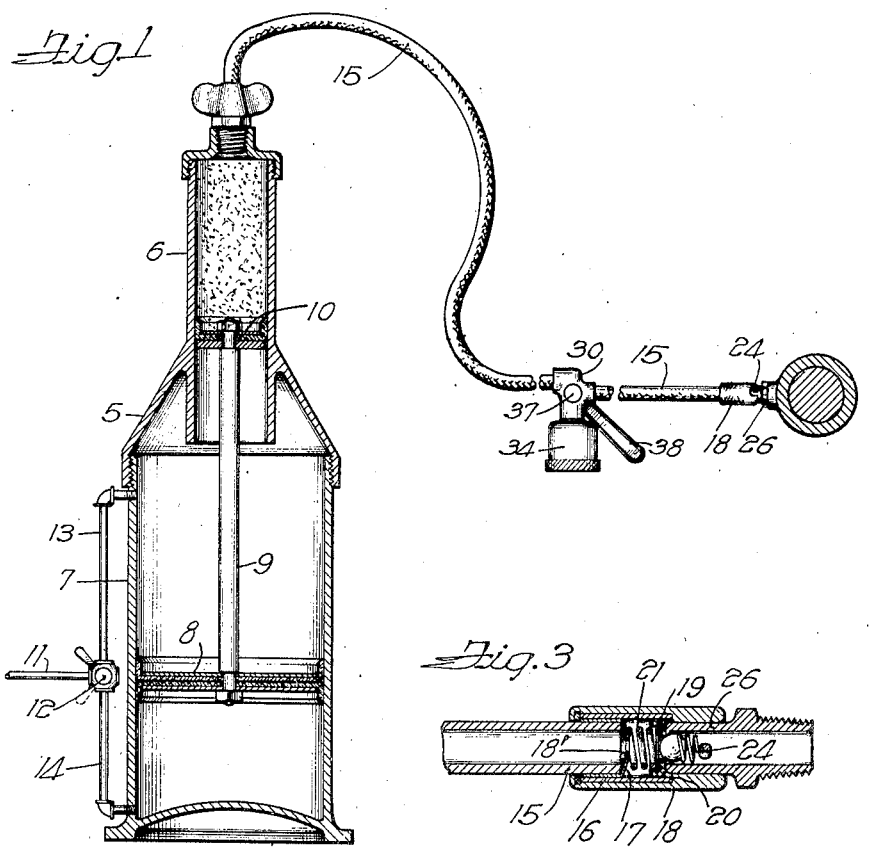
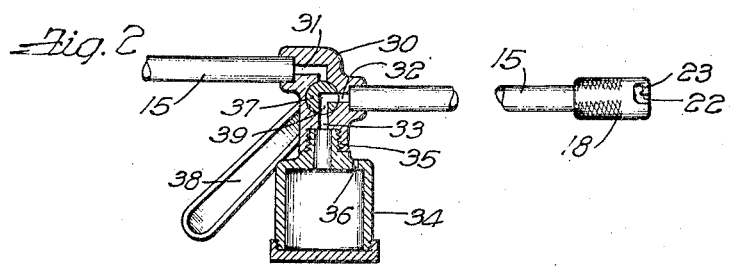
Inventor
Douglas F. Fesler
Williams, Bradbury
Attys.

UNITED STATES PATENT OFFICE.

DOUGLAS F. FESLER, OF EVANSTON, ILLINOIS, ASSIGNOR, BY MESNE ASSIGNMENTS, TO THE BASSICK MANUFACTURING COMPANY, A CORPORATION OF DELAWARE.

LUBRICATING SYSTEM.

1,408,573. Specification of Letters Patent. Patented Mar. 7, 1922.

Application filed March 17, 1920. Serial No. 366,613.

*To all whom it may concern:*

Be it known that I, DOUGLAS F. FESLER, a citizen of the United States, and resident of Evanston, in the county of Cook and State of Illinois, have invented a certain new and useful Improvement in Lubricating Systems, of which the following is a full, clear, concise, and exact description, reference being had to the accompanying drawings, forming a part of this specification.

My invention relates to improvements in lubricating systems and is especially concerned with improvements in lubricating systems of the type disclosed in the patent to Arthur V. Gullborg, Serial No. 1,307,734 of June 24th, 1919.

The above mentioned patent discloses a lubricating system comprising a plurality of coupling members or nipples adapted to be attached to a plurality of bearings forming portions of a mechanism to be lubricated. A lubricant compressor is provided, having a flexible discharge conduit, one end of which is provided with a coupling member adapted to be successively attached to and detached from the coupling members or nipples and providing a fluid-tight connection between the discharge conduit of the lubricant compressor and the nipples.

The coupling member forming a part of the system disclosed in the Gullborg patent is so constructed that to release it from the nipples, it is first necessary to force it toward the nipples before it can be rotated to detach it therefrom. With this means, it is necessary each time the coupling member is detached from a nipple, to first relieve the pressure on the lubricant because if the pressure is not relieved it is difficult, if not impossible, to move the coupling member toward the nipples to release it therefrom if there is any considerable pressure on the lubricant, and second, because there in nothing to prevent the lubricant from being discharged through the coupling member when it is detached from the nipples if the lubricant is under pressure.

While the above described system is entirely practicable where the lubricant compressor is portable and is designed to be carried by the mechanism to be lubricated by the person operating it, so that it is easy to relieve the pressure each time the coupling member is to be detached from the nipple, it is one of the objects of my invention to provide a lubricating system adapted to be used in garages and other places where a plurality of vehicles are to be lubricated, comprising means for holding a considerable quantity of lubricant, means for subjecting the lubricant to a continuous pressure, said means having a discharge conduit provided with a coupling member adapted to be connected with the nipples and means whereby the coupling member can be attached to and detached from the nipples without the necessity of each time relieving the pressure on the lubricant in the compressor.

Another object of my invention is to provide means of the character described wherein the means for relieving the pressure on the lubricant confined in the coupling member is located adjacent to the coupling member so that both of these instrumentalities can be conveniently operated at the same time.

A still further object of my invention is to provide a system of the character described, which is simple in construction and economical to manufacture.

Other objects will appear as this description progresses, reference being had to the accompanying drawings wherein—

Figure 1 discloses my complete system, the lubricant compressor and the bearing to which the lubricant is being supplied being shown in section, and the remaining portions being shown in side elevation.

Figure 2 is a detail view, partially in section, showing the means whereby I control the supply of lubricant to the nipples, and the means for relieving the pressure upon the lubricant in the coupling member, and Figure 3 is a central longitudinal section showing the details of a coupling member adapted to be used in connection with my improved system.

Throughout the several figures, similar reference characters will be used to refer to similar parts.

Referring, for the present, to Figure 1, reference character 5 indicates, as a whole, a lubricant compressor which is especially adaptable for use in garages, in which it is common to have an air compressor. This lubricant compressor comprises a pump cylinder 6 adapted to receive a supply of lubricant and an air cylinder 7, having a double acting piston 8 therein which is connected by the piston rod 9 with the piston 10, operating in the cylinder 6. Air under pressure is conveyed from a source, not shown, through a pipe 11 to a four-way-valve 12 which, in conjunction with the pipes 13 and 14, controls the supply of air under pressure to the opposite sides of the piston 8. With the valve in one position, air under pressure is supplied through the pipe 14 to the lower side of the piston 8 and the upper end of the cylinder is vented through the pipe 13 and the four-way-valve to atmosphere. In this manner, pressure is placed upon the lubricant through the piston 10. When the cylinder 6 has been emptied of lubricant by reversing the position of the valve 12, air under pressure is admitted to the upper end of the cylinder 7 through the pipe 13 and exhausted from the lower end through the pipe 14 and the four-way-valve. With this construction, I am enabled to place a continuous pressure upon the lubricant in the cylinder 6, the amount of this pressure being determined by the areas of the pistons 8 and 10 and the pressure of the air supplied through the pipe 11.

For ordinary uses, I prefer that the pressure upon the lubricant in the cylinder 6 should be about 700 or 800 pounds per square inch, although for certain purposes, it may be found necessary to increase this pressure. Suitably connected with the upper end of the lubricant compressor cylinder 6 is a discharge conduit 15 which may be formed in part or in whole of flexible metallic conduit adapted to withstand the pressure to which the lubricant is subjected. Secured to the free end of this conduit is a coupling member comprising a sleeve 16 which is soldered to a cap 17 which, in turn, is soldered to the outer wall of the flexible conduit 15 and the end of which is provided with an aperture 18 registering with the bore of the conduit. Rotatably mounted upon the sleeve 16 is a second sleeve 18. A centrally perforated leather gasket 19 is slidably mounted in the sleeve 16. The outer sleeve 18 is formed with a shoulder 20 toward which the gasket is urged by a spring 21 confined between the gasket and the end of the cap 17. The outer sleeve 18 is provided with a pair of oppositely disposed bayonet slots 22, one edge of which is provided with a locking recess 23 in which the ends of the pins 24 are adapted to seat when the coupling member is connected with the nipples 26 shown in longitudinal section. These nipples are illustrated and described in the patent to Arthur V. Gullborg above referred to. A further description thereof appears to be unnecessary.

The details of the coupling member just described are illustrated and claimed in the co-pending application of Andrew Fesler, Serial No. 294,848 filed May 8th, 1919, and I do not claim the details thereof as any part of my invention. It will be noted that with a coupling constructed as shown, when the coupling member is attached to the nipple, the spring 21 is compressed and tends to hold the ends of the pins 24 in the locking recesses 23 of the slots 22.

It will also be apparent that when lubricant is forced through the conduit under pressure, it will exert its pressure upon the side of the gasket 19 toward the compressor and will tend to separate the coupling member from the nipple thereby locking the ends of the pins 24 in the recesses 23.

From the above description, it will be clear that before the coupling member can be detached from the nipple, the pressure on the lubricant therein must be relieved at least whenever this pressure is sufficient to make it difficult to detach the coupling member from the nipple. At the same time, means must be provided for preventing the lubricant from escaping through the coupling member when it is detached from the nipple. For this purpose, I provide a valve construction intermediate the ends of the conduit 15 which comprises a three-way-valve body 30, having the passageways 31 and 32 formed therein which communicate respectively with that portion of the discharge conduit 15 connected with the compressor and that portion connected with the coupling member. There is a third passageway 33 which communicates with the open end of a receptacle 34 which is detachably connected with the valve body 30 by means of screw threads 35, the receptacle being provided at its end with an air vent 36. A valve 37 is rotatably mounted in the valve body and may be actuated by means of a handle 38 connected therewith. The valve is provided with a right angle passageway 39 adapted to be turned to a position to connect the passageways 31 and 32, thus permitting the passage of lubricant from the compressor to the nipples. When a sufficient quantity of lubricant has been forced into the nipples, and it is desired to disconnect the coupling member from the nipples, the valve is turned to the position shown in Figure 2, thereby connecting the passageway 32 and that portion of the discharge conduit 15 between the valve body 30 and the coupling member with the passageway 33 and the receptacle 34. The lubricant in the coupling member and that portion of the conduit 15 between the valve body and the coupling member is permitted to expand and any pressure exerted thereupon by movement of the coupling member toward the nipple for the purpose of detaching it therefrom will cause a slight amount of the lubricant to be displaced into the receptacle 34. At the same time, the valve disconnects the coupling member from that portion of the discharge conduit intermediate the valve body and the compressor so that there is no discharge of lubricant from the coupling member when it is detached from the nipple. The vent 36 in the top of the receptacle 34 permits the escape of air from the receptacle as the lubricant is deposited therein so as to prevent any back pressure.

While I have described the details of the preferred embodiment of my invention, it is to be clearly understood that my invention is not limited to these details but is capable of other adaptations and modifications within the scope of the appended claims.

Having thus described my invention, what I claim is:

1. The combination with a nipple adapted to receive lubricant under pressure, of a source of lubricant under pressure, a conduit for conducting lubricant from said source to said nipple, comprising a coupling member having means actuated by the pressure of the lubricant for locking said coupling member to said nipple and means forming a part of said conduit for controlling the flow of lubricant through said conduit, and for relieving said coupling member of pressure, comprising a valve having an intake port, a discharge port and a vent port, means for establishing communication between said discharge port and either said intake port or said vent port whereby lubricant is either supplied to said nipple or permitted to expand through said vent port to relieve the pressure on said coupling member, and a receptacle connected with said vent port to receive the discharges therefrom.

2. The combination with a nipple adapted to receive lubricant under pressure, of a source of lubricant under pressure, a conduit for conducting lubricant from said source to said nipple, comprising a coupling member having means actuated by the pressure of the lubricant for locking said coupling member to said nipple and means comprising a valve having an intake port, a discharge port and a vent port and means for establishing communication between said discharge port and either said intake port or said vent port whereby lubricant is either supplied to said nipple or permitted to expand through said vent port to relieve the pressure on said coupling member.

3. The combination with a nipple adapted to receive lubricant under pressure, of a source of lubricant under pressure, a conduit for conducting lubricant from said source to said nipple, comprising a coupling member having means actuated by the pressure of the lubricant for locking said coupling member to said nipple, and means for relieving the pressure on said coupling member while said coupling is attached to said nipple.

4. The combination with a nipple adapted to receive lubricant, of a source of lubricant under pressure situated remotely from said nipple, a conduit for conducting lubricant from said source to said nipple comprising a coupling member having means actuated by the pressure of said lubricant for locking said coupling member to said nipple, and means adjacent said coupling member for controlling the flow of lubricant to said nipple and for relieving said coupling member of the pressure of said lubricant whereby said coupling member can be easily detached from said nipple.

5. The combination with a nipple adapted to receive lubricant, of a source of lubricant under pressure, a conduit for conducting lubricant from said source to said nipple comprising a coupling member having means actuated by the pressure of said lubricant for locking said coupling member to said nipple, and means adjacent said coupling member for relieving said coupling member of the pressure of said lubricant whereby said coupling member can be easily detached from said nipple.

6. The combination with a source of lubricant constantly under pressure, of a nipple for receiving lubricant from said source, a conduit for conducting lubricant from said source to said nipple comprising a coupling member for making a detachable sealed connection with said nipple and means for maintaining said pressure in a portion of said conduit and at the same time reducing said pressure in the portion of said conduit immediately adjacent said coupling member.

7. The combination with a source of lubricant constantly under pressure, of a nipple for receiving lubricant from said source, a conduit for conducting lubricant from said source to said nipple comprising a coupling member for making a detachable sealed connection with said nipple, and means for reducing said pressure in the portion of said conduit immediately adjacent said coupling member.

8. The combination with a member adapted to receive lubricant, of a source of lubricant under pressure positioned remotely from said nipple, a discharge conduit connected with said source of lubricant and provided with a coupling member for connection with said member, the said coupling comprising means actuated by said lubricant pressure for locking said coupling member to said member, and means adjacent said coupling member for relieving said coupling member of said pressure.

9. The combination with a member adapted to receive lubricant, of a source of lubricant under pressure, a discharge conduit connected with said source of lubricant and provided with a coupling member for connection with said member, the said coupling comprising means actuated by said lubricant pressure for locking said coupling member to said member, and means for relieving said coupling member of said pressure.

10. The combination with a member for receiving lubricant, of a source of lubricant under pressure for supplying lubricant thereto, a conduit for conducting lubricant from said source of supply to said member comprising a coupling member adapted to be detachably connected with said member, and means for preventing lubricant from being discharged from said coupling member when detached from said member while said lubricant remains under pressure.

11. The combination with a source of lubricant under pressure, of a discharge conduit therefor comprising a flexible portion and means intermediate the ends of said conduit for relieving the pressure in a portion of said conduit.

12. The combination with a source of lubricant under pressure, of a discharge conduit therefor, and means intermediate the ends of said conduit for relieving the pressure in a portion of said conduit.

13. The combination with a source of lubricant under pressure, of a discharge conduit therefor, the free end of which is provided with means for detachably connecting it with a lubricant receiving member and means for relieving the lubricant in a portion of said conduit from pressure while maintaining the connection between the free end of said conduit and said member and while said lubricant is under pressure.

In witness whereof, I hereunto subscribe my name this 11th day of March, 1920.

DOUGLAS F. FESLER.

Witnesses:
MARY A. COOK,
HAROLD O. VAN ANTWERP.